United States Patent [19]

Tangonan et al.

[11] Patent Number: 5,369,522

[45] Date of Patent: Nov. 29, 1994

[54] MODULATION SYSTEM AND METHOD WITH THIRD ORDER INTERMODULATION DISTORTION REDUCTION

[75] Inventors: Gregory L. Tangonan, Oxnard; Juan F. Lam, Agoura Hills, both of Calif.

[73] Assignee: Hughes Aircraft Company, Los Angeles, Calif.

[21] Appl. No.: 892,842

[22] Filed: Jun. 3, 1992

Related U.S. Application Data

[63] Continuation-in-part of Ser. No. 668,284, Mar. 12, 1991, abandoned.

[51] Int. Cl.⁵ .................. G02F 1/313; H04B 10/14
[52] U.S. Cl. ........................... 359/329; 385/3; 359/238; 359/279
[58] Field of Search ............... 359/182, 188, 195, 238, 359/279, 329; 385/2, 3, 9

[56] References Cited

U.S. PATENT DOCUMENTS

| | | |
|---|---|---|
| 3,946,393 | 3/1976 | Dunne et al. |
| 4,992,754 | 2/1991 | Blauvelt et al. |
| 5,003,546 | 3/1991 | Lidgard et al. |
| 5,015,053 | 5/1991 | Johnson |
| 5,031,235 | 7/1991 | Raskin et al. |
| 5,073,983 | 12/1991 | Pfizenmayer |

OTHER PUBLICATIONS

IEEE Photonics Technology Letters, vol. 3, No. 12, Dec. 1991, New York, pp. 1102–1104, "A novel optical modulator system with enhanced linearization properties", Lam et al.

IEEE Photonics Technology Letters, vol. 3, No. 9, Sep. 1991, New York, pp. 792–795, "An electrooptic intensity modulator with improved linearity", Farwell et al.

IEEE Photonics Technology Letters, vol. 2, No. 12, Dec. 1990, New York, pp. 884–886, "Waveguide modulators with extended linear dynamic range-a theoretical prediction", Lin et al.

Brian H. Kolner et al., "Intermodulation Distortion and Compression in an Integrated electro-Optic Modulator", *Applied Optics*, vol. 26, No. 17, 1 Sep. 1987, pp. 3676–3680.

Zong-Qi Lin et al., "Waveguide Modulators With Extended Linear Dynamic Range-A Theoretical Prediction", *IEEE Photonics Technology Letters*, vol. 2, No. 12, Dec. 1990.

K. Y. Lau et al., "Intermodulation Distortion in a Directly Modulated Semi-Conductor Injection Laser", *Appl. Phys. Lett.* 45(10), 15 Nov. 1984, pp. 1034–1036.

Koai et al; "Digital and Quasi-Linear Electrooptic . . . ", IEEE J. Quantum Electrom, vol. 08–22, No. 12, pp. 2191–2141, Dec. 1986, Abstract.

Hu et al, "A New Method of Third-Order Intermodulation . . . ", IEEE Trans. Microwave Theory & Tech, vol. MIT-34, #2, pp. 245–250, Feb. 1986.

(List continued on next page.)

*Primary Examiner*—Nelson Moskowitz
*Attorney, Agent, or Firm*—V. D. Duraiswamy; W. K. Denson-Low

[57] ABSTRACT

When an optical signal is modulated at two modulation frequencies, third order intermodulation distortion (IMD) is eliminated by inducing an out-of-phase signal that is complementary to the modulated signal, and cross-coupling the two signals with each other to remove the third order terms. An optical beam in a first waveguide is electro-optically modulated and coupled with a second waveguide to induce the out-of-phase complementary beam therein. A second optical coupler is provided that cross-couples the beams in the two waveguides downstream from the first optical coupler. The optical coupling coefficients, the coupler lengths, and the differential between the optical propagation coefficients of the two waveguides within the first coupler are selected empirically to substantially negate third order IMD. The differential in propagation coefficients is established by the DC bias of the modulation signal. Enhanced linearity can be obtained by inducing a compensating phase shift either in the second optical coupler, or between the first and second optical couplers.

20 Claims, 8 Drawing Sheets

OTHER PUBLICATIONS

Grinberg et al, "The Possibility of Reducing Third-Order Intermodulation Distortions in FET Amplifiers", Radioelectron. & Commun. Syst. (USA), vol. 29, No. 8, pp. 71–73, 1986, Abstract.

Farwell et al, "An Electrooptic Intensity Modulator with Improved Linearity", IEEE Photonics Tech. Ltrs., vol. 3, No. 9, Sep. 1991, pp. 792–795.

G. E. Bodeep et al., "Semiconductor Lasers Versus External Modulators: A Comparison of Nonlinear Distortion for Lightwave Subcarrier CATV Applications", *IEEE Photonics Technology Letters*, vol. 1, No. 11, Nov. 1989.

G. E. Betts, "High-Performance Optical Analog Link Using External Modulator", *IEEE Photonics Technology Letters*, vol. 1, No. 11, Nov. 1989.

Steven K. Korotky, "Dual Parallel Modulation Schemes for Low-Distortion Analog Optical Transmission", *IEEE Journal on Selected Areas in Communications*, vol. 8, No. 7, Sep. 1990, pp. 1377–1381.

MODULATION SYSTEM AND METHOD WITH THIRD ORDER INTERMODULATION DISTORTION REDUCTION

RELATED APPLICATION

This is a continuation-in-part of Ser. No. 07/668,284, filed Mar. 12, 1991, now abandoned.

BACKGROUND OF THE INVENTION

1. Field of the Invention

This invention relates to multiple frequency modulation systems and methods, and more particularly to the modulation of an optical beam at two modulation frequencies that are subject to third order intermodulation distortion (IMD).

2. Description of the Related Art

IMD is a major obstacle in the design of an optimum multi-channel optical signal transmission system. It sets a practical limit to the degree of linearity over the dynamic range of the system, and limits the dynamic range itself. The lower end of the system's dynamic range is set by its noise floor, while the upper end is set by the IMD. The upper limit for the input power is the drive level at which the IMD terms begin to exceed the level of the noise floor. The system's distortion-free dynamic range is defined as the difference between the lower and upper drive levels.

IMD results when an optical beam is modulated by a radio frequency (rf) signal having two modulation frequencies $\omega_1$ and $\omega_2$. The modulating signal frequencies interact within the beam and produce higher order modes that can lead to distortion. When an electrical modulation signal is used to modulate the beam through an electro-optic coupler, the ratio of output to input optical powers may be expressed as:

$$\frac{P_{out}}{P_{in}} \propto T_0 V_0 + T_1 V_1 + T_2 V_1^2 + T_3 V_1^3 + T_4 V_1^4 + T_5 V_1^5 + \ldots,$$

where $T_0$, $T_1$, $T_2$, ... are the gain coefficients for the zero, first, second, ... order modulation signals, $V_0$ is a DC offset value, $V_1 = A_1 \cos\omega_1 t + A_2 \cos\omega_2 t$, $A_1$, $A_2$ are constants.

The first order signal represents a linear gain, in which the input signals are reproduced without distortion. The second order signal is the result of two waves interacting within the beam, the third order signal is the result of three waves mixing, etc. The frequency components of the higher order terms are as follows:

second order: $\omega_1 \pm \omega_2$, $2\omega_1$, $2\omega_2$
third order: $2\omega_1 \pm \omega_2$, $2\omega_2 \pm \omega_1$, $3\omega_1$, $3\omega_2$
fourth order: $4\omega_1$, $4\omega_2$, $3\omega_1 \pm \omega_2$, $3\omega_2 \pm \omega_1$, $2\omega_2 \pm 2\omega_1$
fifth order: $5\omega_1$, $5\omega_2$, $4\omega_1 \pm \omega_2$, $4\omega_2 \pm \omega_1$, $3\omega_1 \pm 2\omega_2$, $3\omega_2 \pm 2\omega_1$, $2\omega_2 \pm 3\omega_1$, $2\omega_2 \pm \omega_1$, $2\omega_1 \pm \omega_2$ The gain coefficients for the second and higher order effects are less than unity, and progressively decrease as the order increases. The frequency range can generally be selected so that the second order effects can be filtered from the output, leaving the third order IMD as the limiting factor in dynamic range.

SUMMARY OF THE INVENTION

The present invention seeks to provide an optical modulation system and operating method that substantially eliminates third order IMD from the output, thereby increasing the system's distortion-free dynamic range over which its response is essentially linear. It also seeks to greatly reduce second order IMD.

These goals are accomplished by modulating an input optical signal at two modulating frequencies, generating an optical signal that is complementary to and out-of-phase with the modulated signal, and coupling the complementary signal back with the modulated signal to linearize it and negate third order IMD over an expanded operating range. The system is preferably implemented with a pair of waveguides and two successive optical couplers between the waveguides. The first optical coupler includes an electro-optic modulator for the first waveguide. An input optical signal is transmitted through the first waveguide and electro-optically modulated within the first optical coupler. An out-of-phase component of the modulated signal is induced into the second waveguide at the first optical coupler. The electric field applied across the first waveguide at the first coupler changes the waveguide's optical propagation coefficient, which in turn determines how much the induced signal in the second waveguide will be out-of-phase with the input signal remaining in the first waveguide. At the second optical coupler, a portion of the complementary signal in the second waveguide is cross-coupled back with the first waveguide.

The optical couplers are characterized by respective coupling coefficients and lengths, while the waveguides are characterized by respective optical propagation coefficients within the couplers. The coupling coefficients and lengths for the two optical couplers, and the bias voltage for the electrical modulating signal (and thereby the optical propagation differential between the first and second waveguides within the first optical coupler) are selected to substantially reduce third order IMD in the output beam. For this purpose the optical propagation differential between the two waveguides in the second optical coupler is preferably zero.

In a specific implementation, the products of the coupling coefficients and lengths of the first and second optical couplers are respectively about $9\pi/2$ and 1.605, while the product of the length and waveguide propagation differential for the first optical coupler is about 6.79. With these parameters third order IMD is eliminated, as is second order IMD. Alternately, for modulating frequencies that produce second order effects outside of the modulation bandwidth, the system parameters can be selected to leave a substantial second order effect that can simply be filtered out. Enhanced input/output linearity can be obtained by inducing a compensating phase shift, in the first waveguide, either at the second optical coupler or between the first and second optical couplers.

These and other features and advantages of the invention will be apparent to those skilled in the art from the following detailed description, taken together with the accompanying drawings, in which:

DETAILED DESCRIPTION OF THE INVENTION

The invention is primarily directed toward the elimination of third order IMD from modulated optical beams, and is implemented with a system of optical couplers. However, its principles are also applicable to the elimination of third order IMD in electrical signals. At present electrical analogs of optical couplers are not believed to be available, which makes it difficult to implement the invention in an electrical format. However, the improvements offered by the invention could also be used in electrical communications systems if electrical analogs of optical couplers do become available.

Figure 1:
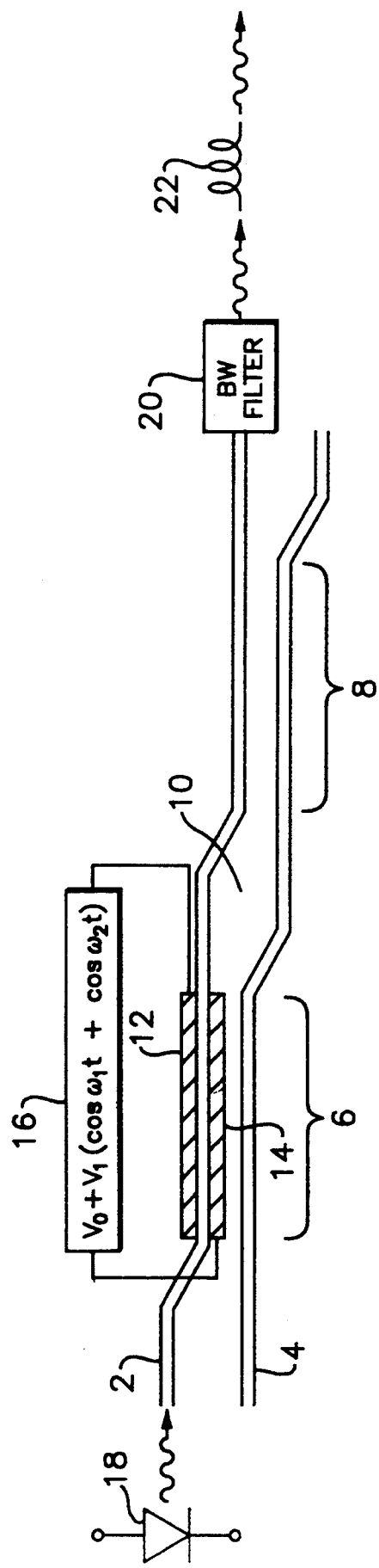
FIG. 1 is a simplified plan view of a dual waveguide system that can be used to implement the invention.

The elimination of third order IMD is achieved by obtaining an out-of-phase complement of the original modulated optical beam, and then coupling the complementary signal back with the original beam to linearize its power response about an expanded modulation operating range. A system for implementing this concept is illustrated in FIG. 1. It consists of a pair of optical waveguides 2, 4 that are brought close enough to each other to induce mutual optical coupling in a first optical coupler region 6, and again in a downstream optical coupler region 8. The first optical coupler 6 extends over a length $L_1$ and is characterized by a coupling constant $k_1$, as determined by the proximity of the two adjacent waveguides, which are separated by a dielectric material 10. The second optical coupler 8 has a length $L_2$ and a coupling constant $k_2$. Each of the waveguides has an optical propagation coefficient $\beta$, which depends in part upon the material from which they are formed.

A pair of conductive electrodes 12, 14 are provided on opposite sides of waveguide 2 within optical coupler 6. A voltage source 16 applies a voltage across the electrodes that consists of a DC bias $V_0$ and a smaller AC modulation signal $V_1$ at rf modulation frequencies $\omega_1$ and $\omega_2$. Typical wavelengths are 1.3 microns for short range communications and 1.5 microns for long haul fiber optic communications.

The DC bias voltage $V_0$ alters $\beta$ for waveguide 2 within the optical coupler 6, thus establishing a non-zero differential in propagation coefficients between waveguides 2 and 4 within coupler 6 (assuming $\beta$ for waveguides 2 and 4 are equal when no voltage is applied). This differential in propagation coefficients over the first optical coupler is denoted $\Delta\beta_1$. The $V_1$ component allows a flow of rf signals into the waveguide for the purpose of achieving microwave modulation at the two frequencies $\omega_1$ and $\omega_2$.

The second optical coupler 8 is optically downstream from coupler 6, and is arranged such that its differential in optical propagation coefficients between the two waveguides ($\Delta\beta_2$) is equal to zero. This is achieved by using identical constructions for the two waveguides, and not adding a modulation to either waveguide within the second optical coupler 8. The two waveguides are parallel to each other within both optical couplers, which may therefore be referred to "directional" couplers.

In operation, an optical source such as a semiconductor or solid state laser, shown as a diode-pumped YAG laser 18, illuminates the input port of waveguide 2. The term "optical" is used in its broad sense as including all radiation confinable within a waveguide, and is not limited to the visible spectrum. The optical signal is transmitted through the waveguide to the first optical coupler 6. The waveguides 2 and 4 are close enough together within the optical coupler 6 that evanescent coupling is produced between the two over the coupler length. That is, an optical beam propagating within one waveguide will oscillate back and forth between the two waveguides as it progresses along the coupler. The spatial period of this oscillation depends upon the refractive index differential between the waveguides 2, 4 and the interguide cladding region 10. Thus, at the end of the coupler 6 respective portions of the original beam will be travelling within each of the waveguides 2 and 4. Since the optical signal propagates at different speeds within the two waveguides over coupler 6, due to the application of $V_0$ to waveguide 2 and the resulting non-zero $\Delta\beta_1$, the signal component within waveguide 4 at the end of the optical coupler will be out-of-phase with the component remaining within waveguide 2.

At the second optical coupler 8, cross-coupling takes place between the optical signals and the two waveguides. Since $\Delta\beta_2=0$, coupling occurs with in-phase components of each signal. By an appropriate selection of the coupling constants $k_1$ and $k_2$, the optical coupler lengths $L_1$ and $L_2$, and $\Delta\beta_1$ (which is a function of $V_0$), third order IMD can be effectively eliminated from the outputs of both waveguides 2 and 4. A linearized output can be taken from either waveguide; the two output signals will be out-of-phase with each other.

The k, L and $\Delta\beta_1$ parameters can also be selected to keep second order IMD very low. Alternately, if $\omega_1$ is greater than $\omega_2$ but less than twice $\omega_2$, the second order IMD components will generally be outside of the bandwidth established between $\omega_1$ and $\omega_2$. In this case a filter 20 can be added to whichever waveguide is selected for an output to remove signals outside of the $\omega_1-\omega_2$ bandwidth. The resulting low distortion optical signal can then be transmitted over an optical fiber 22 to complete a communications link.

Figure 2:
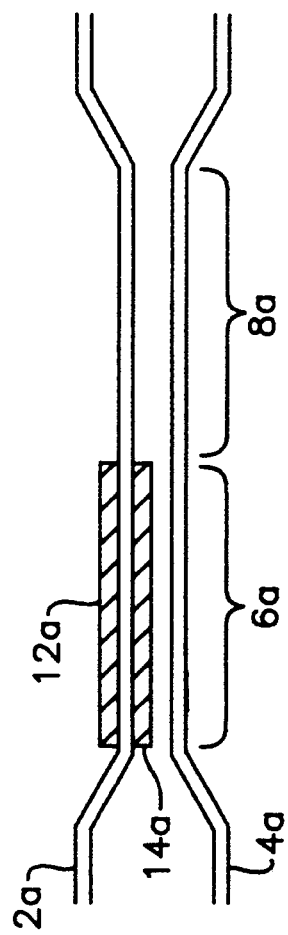
FIG. 2 is a simplified plan view of an alternate system for implementing the invention.

An alternate physical arrangement that achieves the same results is illustrated in FIG. 2. Again, a pair of optical couplers are arranged in tandem, with modulation applied to one waveguide within the first optical coupler via an electro-optic coupler. In this case the two waveguides 2a and 4a are positioned parallel and close together over a continuous length that defines the two optical couplers 6a and 8a in succession. Electrodes 12a and 14a are placed adjacent to waveguide 2a within the first optical coupler 6a; the second optical coupler 8a is a continuation of coupler 6a, but may have a different length and does not include modulating electrodes.

Figure 3:
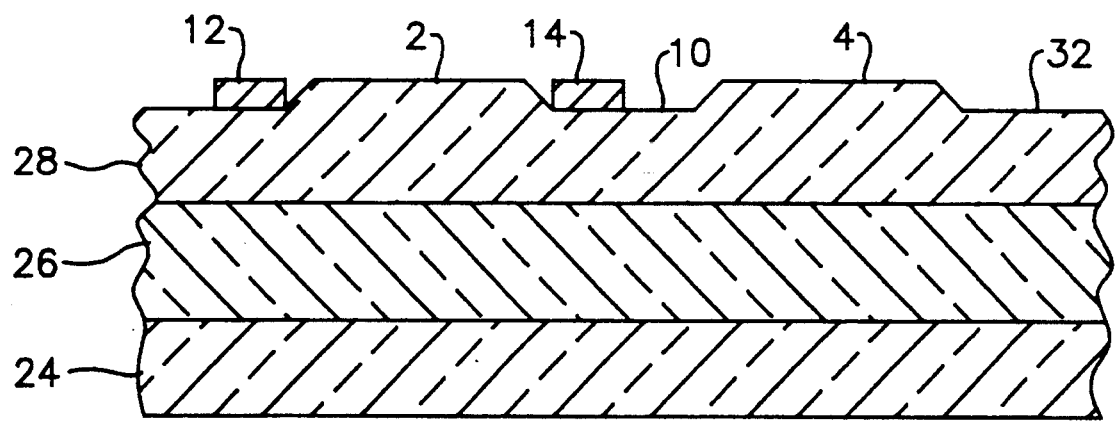
FIG. 3 is a sectional view of the first optical coupler for both FIGS. 1 and 2.

A physical construction for the waveguides and optical couplers is shown in FIG. 3. The device consists of a pair of parallel rib waveguides formed on a GaAs/AlGaAs epitaxial heterostructure using standard photolithography and wet etching techniques; silicon, lithium niobate or other suitable semiconductor material could also be used.

The device is formed on a GaAs substrate 24. An AlGaAs cladding layer 26 is provided over substrate 24, and is capped with a layer 28 of GaAs. Layers 26 and 28 are preferably lightly doped, respectively on the order of $2 \times 10^{15}$ and $10^{15}/cm^3$, and are preferably on the order of 4.5 and 3.0 microns thick, respectively.

The thickness of GaAs layer 28 is somewhat greater in regions 2 and 4, preferably by about 0.2 microns, and these regions comprise the cores of the rib waveguides. The thickness of layer 28 in the regions 30 and 32 lateral to the waveguide cores, and in the interguide region 10 between the two cores, is somewhat less. This causes the regions 10, 30 and 32 to have a slightly lower effective refractive index than the core regions 2 and 4. The regions of reduced thickness 10, 30 and 32 thus act as lateral cladding layers for the core regions 2 and 4. With the dimensions and compositions discussed above, the effective refractive index of the core regions 2 and 4 is, for radiation with a 1.3 micron wavelength, roughly 0.0005 to 0.0010 larger than that for the interguide and lateral cladding regions 10, 30 and 32. While this differential is small, it is enough to provide guidance for optical radiation propagating along core regions 2 and 4. These core regions thus act as waveguide cores surrounded by cladding, with the cladding region 10 common to both waveguides and functioning as the interguide region over which optical coupling takes place.

Figure 4:
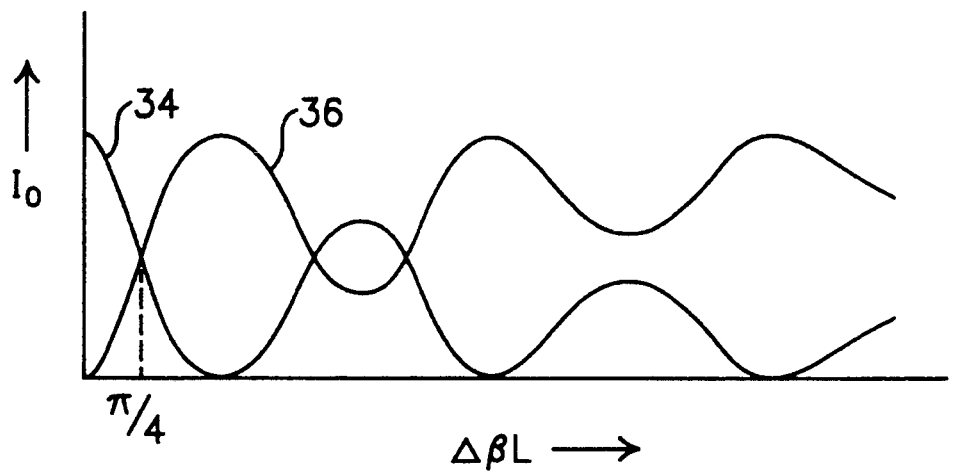
FIG. 4 is a graph showing the complementary signal pattern for the two waveguides resulting from the first optical coupler.

FIG. 4 illustrates the coupling that occurs between the two waveguides within the optical couplers. The vertical axis represents the optical intensity at the output of each waveguide, while the horizontal axis is the product of $\Delta\beta$ and L. Since $\Delta\beta$ is a function of $V_0$, the horizontal axis may also be taken as a measure of the DC bias level for the applied modulating signal.

Curve 34 represents the optical signal within the originating waveguide, while curve 36 represents the optical signal induced into the second waveguide by the optical coupler. The two signals 34 and 36 are complementary to each other, summing to a constant level equal to the original signal level in the first waveguide at all locations along the $\Delta\beta L$ axis. It is conventional to select an operating point at $\Delta\beta L = \pi/4$ by an appropriate selection of $V_0$. At this point the levels of signals 34 and 36 are equal, and the curves are most nearly linear. At $\pi/4$ the second order IMD terms are equal to zero, and the third order IMD is at a minimum because of the rough linearity of the curves.

Figure 5:
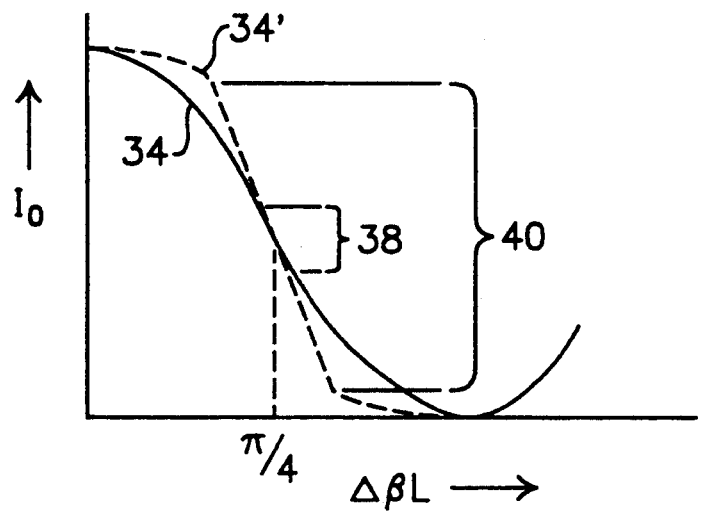
FIG. 5 is a graph illustrating the linearizing effect of the invention, in exaggerated form.

While third order IMD is at a minimum at the $\pi/4$ operating point, it is still significant and imposes an upper limit on the system's dynamic range. This situation is illustrated in FIG. 5, which is an expansion of the initial portion of FIG. 4 for the curve 34. It can be seen that the portion of curve 34 that is nearly linear on either side of the $\pi/4$ point is actually quite small. This near-linear portion, which establishes the effective dynamic range of prior systems, is indicated by numeral 38. The curvature near $\pi/4$ indicates the presence of higher order terms. By coupling a portion of signal 36 back with signal 34 at the downstream optical coupler, the invention shifts curve 34 to curve 34' (exaggerated in FIG. 5), in which the linear region 40 is much greater than in the original curve, and therefore allows for a much greater distortion-free dynamic range than could previously be obtained. In so doing, the DC bias level is shifted slightly to the right of $\pi/4$.

A mathematical relationship between the various orders of response to an input optical signal (including third order IMD) as a function of $k_1$, $k_2$, $L_1$, $L_2$ and $\Delta\beta_1$ is given below. A computer can then be used to determine the various order responses to many different combinations of these parameters. From these responses a particular set of parameters that will result in a very low level of third order IMD, and yet allow a significant portion of the original signal to be transmitted, may be defined. The results of this calculation for one particular set of parameters is displayed in FIGS. 6a-6f.

Figure 6A:
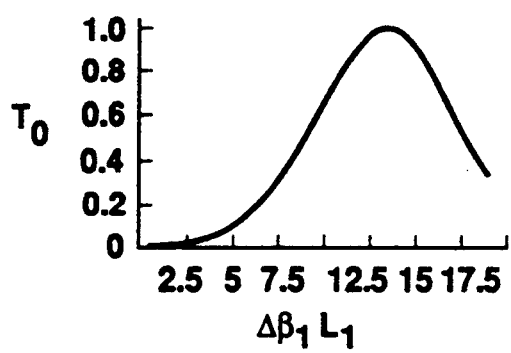
FIGS. 6a–6f are graphs of the gain coefficients for the zero, first, second, third, fourth and fifth order effects of a FIG. 1 system with parameters selected in accordance with the invention.
Figure 6B:
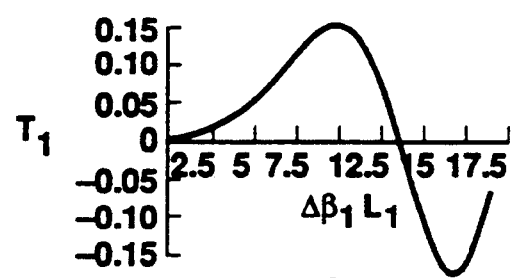
Figure 6C:
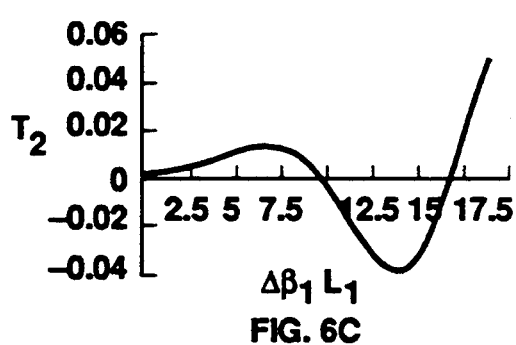
Figure 6D:
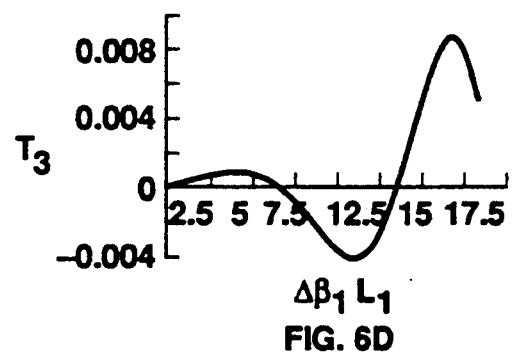
Figure 6E:
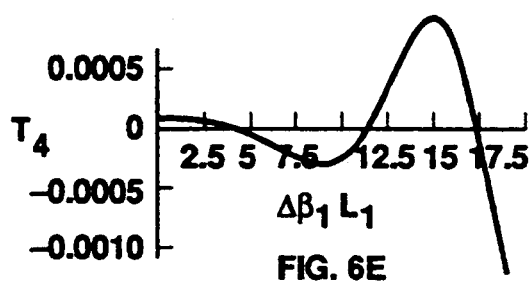
Figure 6F:
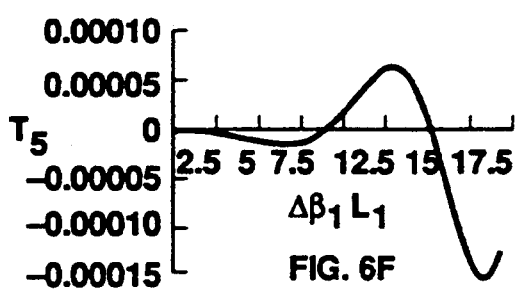

To generate these curves, the products $k_1L_1$ and $k_2L_2$ were taken as $9\pi/2$ and 1.605, respectively. The output responses were plotted as a function of $\Delta\beta_1 L_1$ ($\Delta\beta_2$ was assumed to be 0). The plot of $T_0$ in FIG. 6a shows the DC gain coefficient, the plot of $T_1$ in FIG. 6b shows the first order response to modulation at two frequencies $\omega_1$ and $\omega_2$, and the plots of $T_2$, $T_3$, $T_4$ and $T_5$ in FIGS. 6c, 6d and 6e show second, third, fourth and fifth order IMD respectively (fourth order IMD can generally be filtered out, and in any event is considerably less than third order IMD in conventional systems). Since the optical coupling coefficient k has inverse units of length, the kL terms are dimensionless. The optical propagation coefficient $\beta$ also has inverse units of length, so that $\Delta\beta_1 L_1$ is similarly dimensionless.

Figure 7:
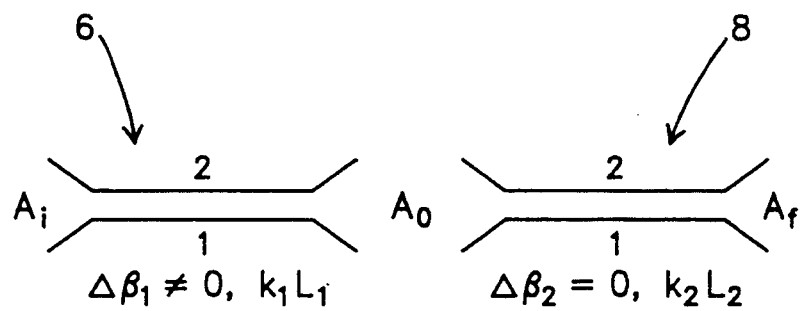
FIG. 7 is a simplified diagram of the system furnishing nomenclature used in a mathematical explanation thereof.

The mathematical formulations used to relate the various transfer factors T to k, L and $\Delta\beta_1$ will employ the notational scheme of FIG. 7. The amplitude of the optical input signal coupled into one of the waveguides (1 or 2) into the first optical coupler 6 is $A_i$, the output from the first coupler 6 that is also the input to the second coupler 8 is $A_o$, and the output of coupler 8 is $A_f$. Using the standard transfer equation for a directional coupler, the output of waveguide 1 to an input of the same waveguide is:

$$e^{+i\frac{\Delta\beta L}{2}} \left[ \cos KL - i\frac{\Delta\beta}{2K} \sin KL \right],$$

where $$K = \sqrt{k^2 + \left(\frac{\Delta\beta}{2}\right)^2}.$$

The output response of waveguide 2 to an input at waveguide 1 is:

$$-i\frac{k}{2K} \sin KL \, e^{-i\frac{\Delta\beta L}{2}}.$$

In each case, the output along the other waveguide will be the complement. If the input signal for waveguide 2 is set equal to zero, then the output optical power coupled into waveguide 2 from the input signal to waveguide 1 is given by the expression:

$$\frac{P_o(2)}{P_i(1)} = \frac{|A_o(2)|^2}{|A_i(1)|^2} = \left(\frac{k}{2K}\right)^2 \sin^2 KL.$$

Adding in the second optical coupler 8 per the present invention, the amplitude of the ultimate output signal $A_f$ is the product of the transfer functions for the two couplers 6 and 8. Again assuming that an initial input is provided to waveguide 1 but not to waveguide 2, the relationship between the output power for waveguide 2 and the input power to waveguide 1 can be stated as:

$$\frac{P_f(2)}{P_i(1)} = \frac{|A_f(2)|^2}{|A_i(1)|^2} = \sin^2 k_2 L_2 +$$

$$|T_{12}|^2 \cos 2k_2 L_2 + \sin 2k_2 L_2 \times \frac{k_1}{2K} \sin^2 KL_1$$

where $$|T_{12}|^2 = \left(\frac{k_1}{K_1}\right)^2 \sin^2 K_1 L_1.$$

The power relationship $P_f(2)/P_i(1)$ can also be expressed as a Taylor expansion of the equation given above for this term. The expansion has been performed using a MacIIfx computer by Apple Computer, Inc. and the "Mathematica" symbolic programming language from by Wolfram Research, Inc. in Illinois. For the case of rf modulation, $$V(t) = V_0 + V_1(\cos\omega_1 t + \cos\omega_2 t).$$

The term $\Delta\beta$ can be expressed as:

$$\Delta\beta = \Delta\beta_{V_0} + Z_{V_1},$$

where $\Delta\beta_{V_0}$ is the static contribution due to the DC bias, and $Z_{V_1}$ is the term due to the AC modulation. The latter component is established as:

$$Z_{V_1} = \left(\frac{\pi}{\lambda}\right) n_o^3 r \left(\frac{V_1}{d}\right),$$

where $\lambda$ is the wavelength of light, $n_o$ is the index of refraction, r is the electro-optic coefficient and d is the separation between the electrodes.

In the practical case in which $V_1$ is much smaller than $V_o$, the relationship between the optical power at the final output port of waveguide 2 relative to the input port for waveguide 1 is:

$$\frac{P_f(2)}{P_i(1)} = \sum_{n=o}^{\infty} T_n Z_{V_i}^n = T_0 +$$

$$T_1 Z_{V_i} + T_2 Z_{V_i}^2 + T_3 Z_{V_i}^3 + T_4 Z_{V_i}^4 + T_5 Z_{V_i}^5 + \ldots$$

Since two expressions have been established for $P_f(2)/P_i(1)$, one in terms of k, L and $\Delta\beta$ and the other in terms of $T_n$, the computer can be used to graphically evaluate $T_n$ as a function of $\Delta\beta L1$ for different values of $k_1 L_1$ and $k_2 L_2$.

Figure 8:
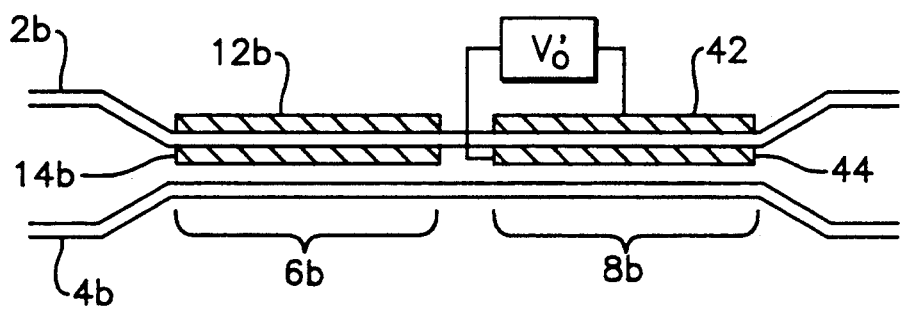
FIGS. 8 and 9 are simplified plan views of third and fourth embodiments of the invention.
Figure 9:
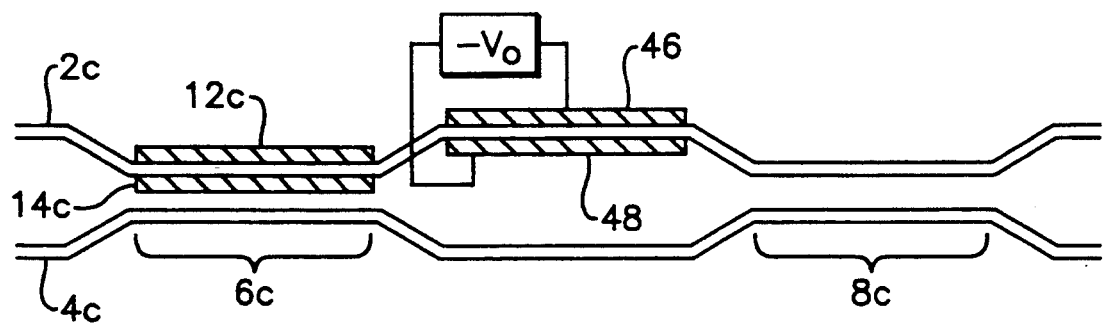
Figure 10A:
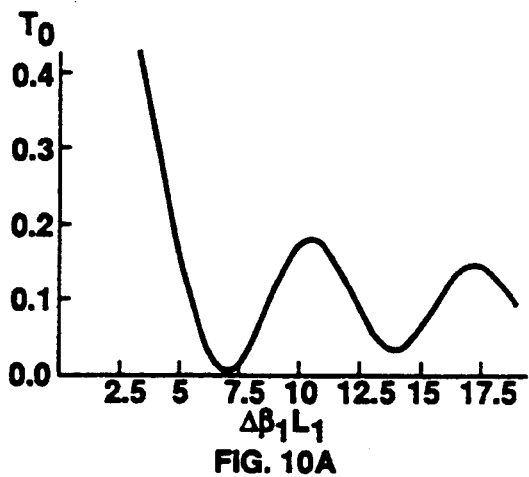
FIGS. 10a–10e are graphs of the gain coefficients for the zero, first, second, third and fifth order effects for a FIG. 8 system.
Figure 10B:
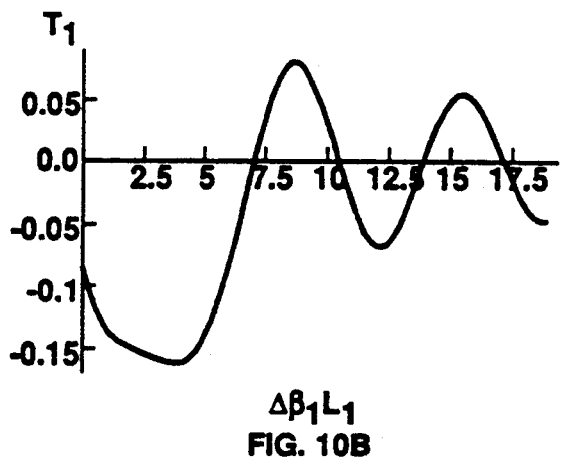
Figure 10C:
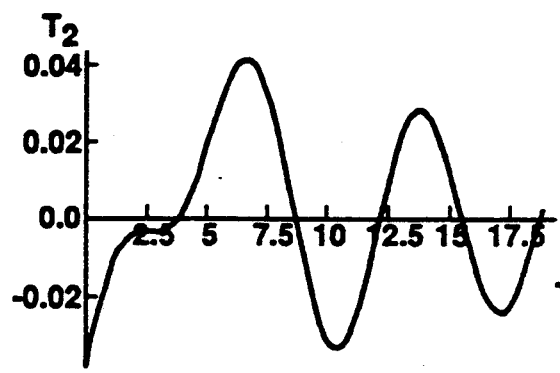
Figure 10D:
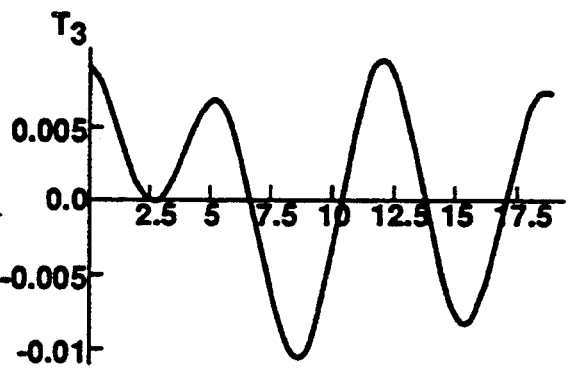
Figure 10E:
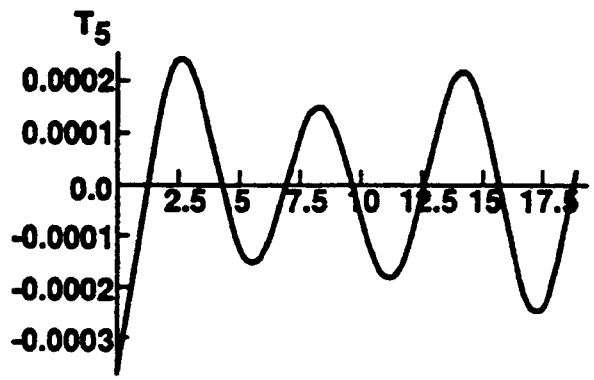

Two additional embodiments of the invention that provide an enhanced linearity are shown in FIGS. 8 and 9. In FIG. 8 a second set of electrodes 42 and 44 have been added on opposite sides of the waveguide 2b within the second coupler 8b; the first coupler 6b is modulated the same as the first coupler 6 in FIG. 1. A DC bias voltage $V_o'$ is applied across the second coupler electrodes to produce a phase shift in the waveguide 2b that has been found to improve the input-output linearity. In practice the optimum phase shift has been found to be 1.299 $\pi$ radians, which can be achieved by setting $V_o'$ equal to $V_o$ for equal length first and second coupler electrodes 12b, 14b and 42, 44; a compensating adjustment to $V_o'$ can be made for differing electrode lengths.

The results of an analysis of the optical transfer function for the system of FIG. 8, using identical procedures as for FIGS. 6a–6f, are shown in FIGS. 10a–10e for $T_o$, $T_1$, $T_2$, $T_3$, and $T_5$, respectively. The parameters used for this analysis were $k_1 L_1 = \pi/2$, $k_2 L_2 = \pi/2$ and $\Delta\beta_2 L_2 = 1.299\pi$. Again, the third order coefficient of the series expansion was found to have zero crossings at several locations of $\Delta\beta_1 L_1$. The improvement in linearity is evidenced in FIG. 10b by the nearly flat response of the coefficient $T_1$ in the region surrounding the first zero of $T_3$ (at $\Delta\beta_1 L_1 = 2.5$).

In FIG. 9 an electrode pair 46, 48 has been added on opposite sides of the waveguide 2c between the first and second directional couplers 6c and 8c; the first coupler 6c is modulated the same as the first coupler 6 in FIG. 1. The two waveguides 2c and 4c are separated at the site of the additional electrodes to inhibit cross-talk. A significant improvement in system linearity can be achieved by biasing the electrodes 46, 48 at $-V_o$ (for electrode lengths equal to the lengths of electrodes 12c and 14c in the first directional coupler), thereby producing a phase shift that is the negative of the accumulated phase shift produced during propagation through the first directional coupler 6c.

Figure 11A:
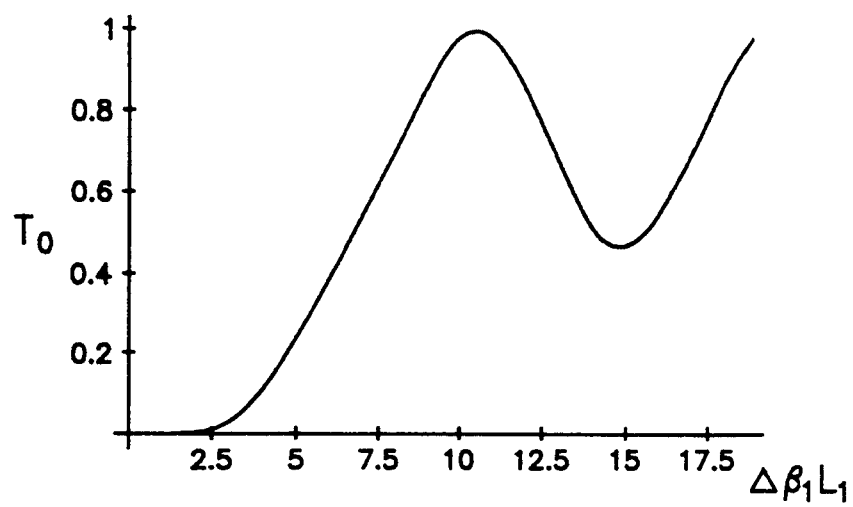
FIGS. 11a–11e are graphs of the gain coefficients for the zero, first, second, third and fifth order effects for a FIG. 9 system.
Figure 11B:
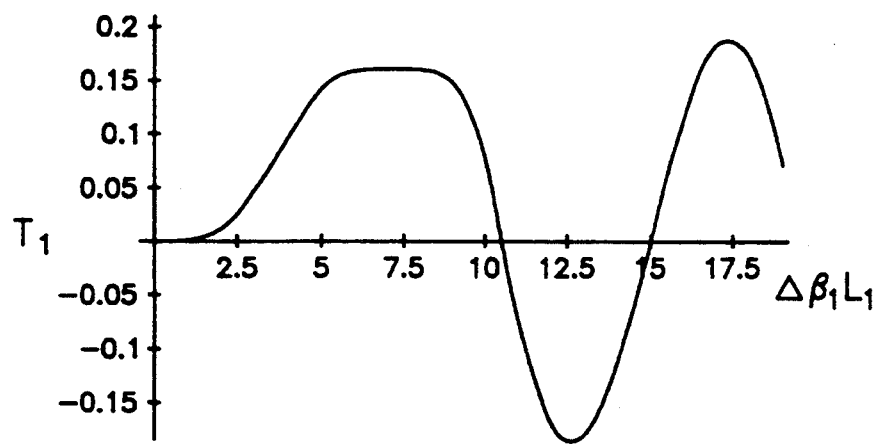
Figure 11C:
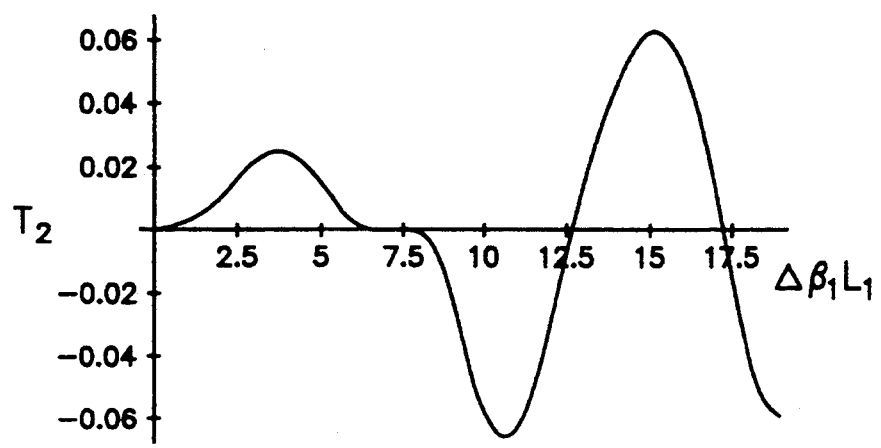

FIGS. 11a–11e show the results of an analysis of the optical transfer function for the system of FIG. 9, using identical procedures as for FIGS. 6a–6f, for $T_o$, $T_1$, $T_2$, $T_3$ and $T_5$, respectively. In FIG. 11b there is a flat response of the coefficient $T_1$ in the region surrounding the first zero of $T_3$ (at $\Delta\beta_1 L_1 = 7.438$).

Figure 11D:
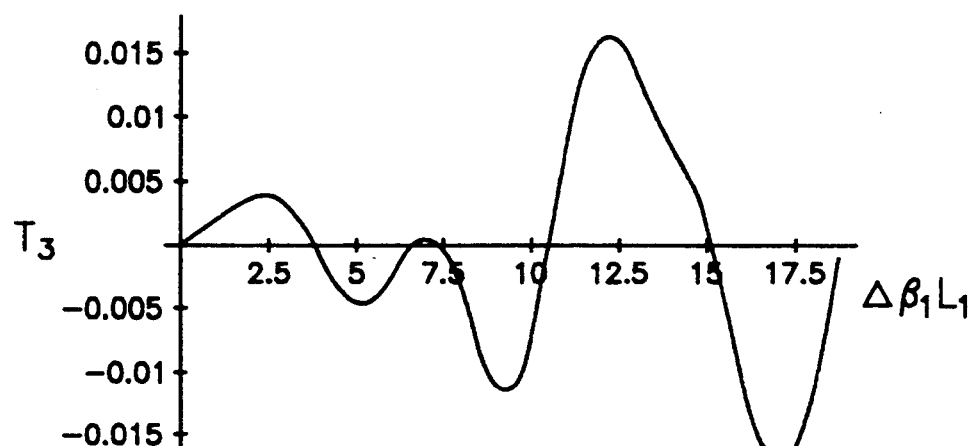
Figure 11E:
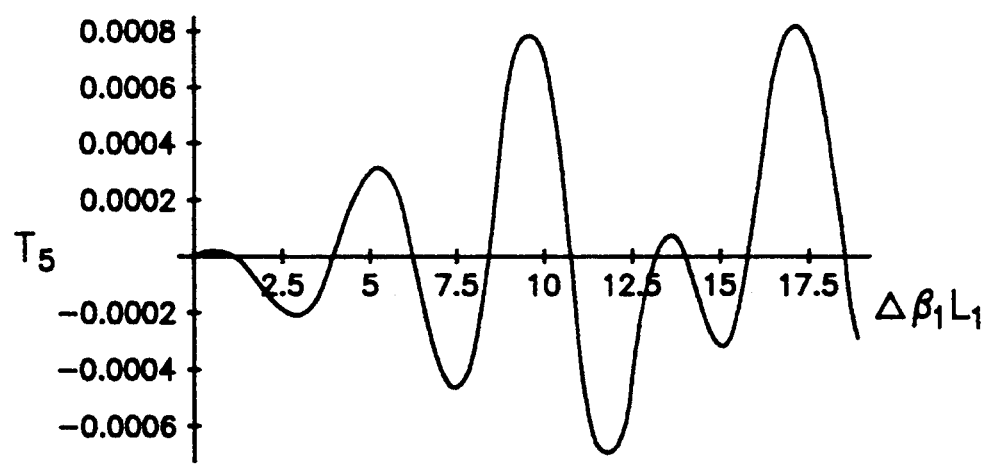

It can be seen from FIG. 11d that $T_3$ is equal to zero at several different values of $\Delta\beta_1 L_1$. The most preferred of these different values to use as an operating point will leave $T_0$ and $T_1$ relatively high, while minimizing the second order IMD term $T_2$. This optimum value of $\Delta\beta_1 L_1$ occurred at 6.79. Depending upon the parameters of the particular system under study, an optimum bias voltage that will produce this value of $\Delta\beta_1 L_1$ can be calculated. If any of the k or L factors are changed, the optimum operating point would shift to new values of $\Delta\beta_1$ and $V_0$.

Figure 12:
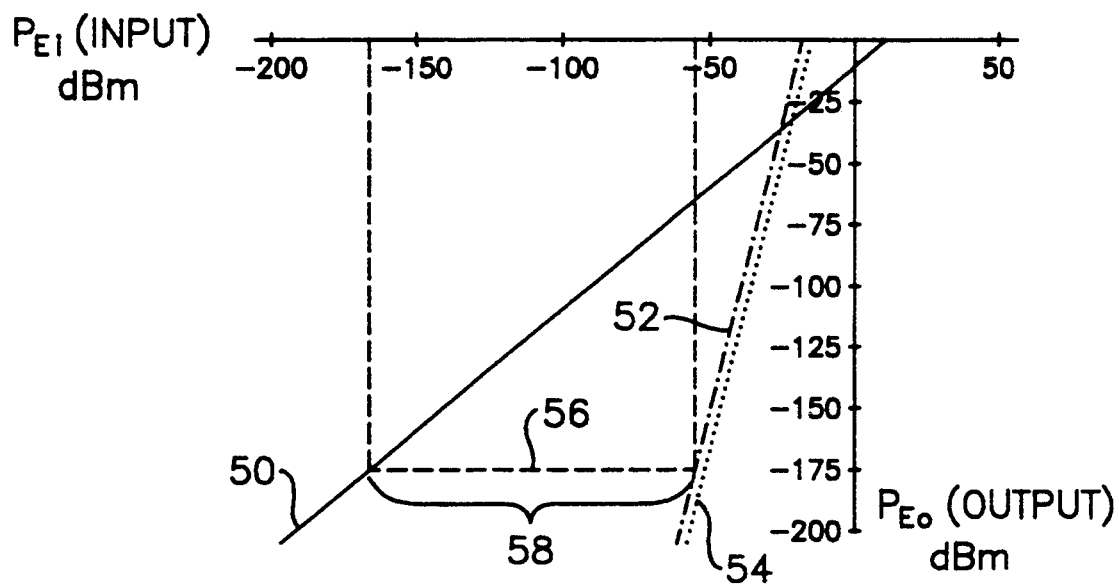
FIG. 12 is a graph showing the improved distortion-free dynamic range achieved with the invention.

A plot of the significantly improved distortion-free dynamic range calculated for the embodiment of FIG. 9 is presented in FIG. 12. The input power $P_{Ei}$ represents the electrical power of an rf signal with the frequencies $\omega_1$ and $\omega_2$ used to modulate the optical beam, while $P_{Eo}$ represents the output electrical power received by an optical-electro converter positioned in the path of the output optical beam. The detected electrical output power for mode $T_1$ is indicated by straight line 50, while the fifth order $T_5$ IMD components from the mixing terms $(2\omega_1 - \omega_2)$ and $(3\omega_1 - 2\omega_2)$ are indicated by lines 52 and 54, respectively. The thermal noise floor 56 was set at −174 dBm.

The calculated distortion-free dynamic range 58 is estimated to be 110 dB for a bias voltage of 1 volt and optical power of 10 mW at the detector. This example demonstrates a significant increase in distortion-free dynamic range compared to prior electro-optically modulated optical links.

Figure 13:
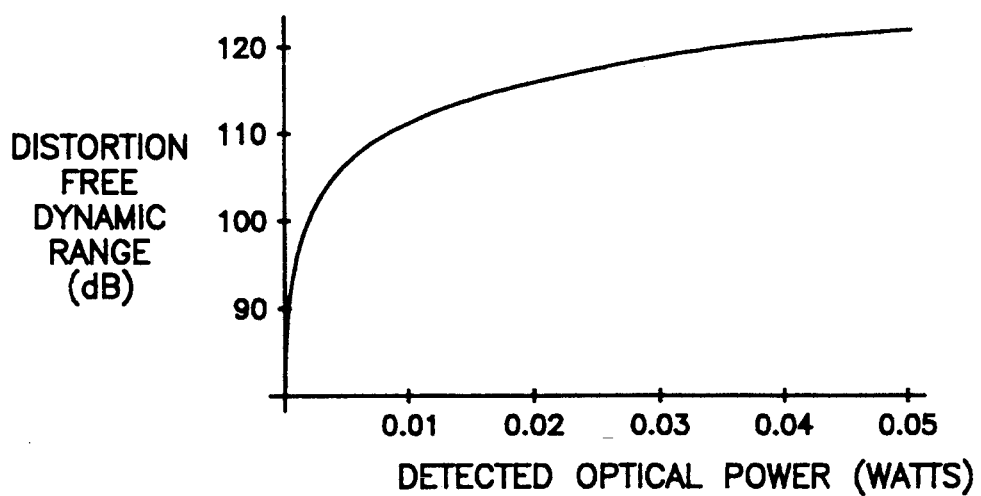
FIG. 13 is a graph of the distortion-free dynamic range as a function of detected optical power.

FIG. 13 is a graph of the calculated distortion-free dynamic range for the described system as a function of the detected optical power, assuming that the noise floor is determined by thermal effects and is −174 dBm. The graph provides a figure of merit for the system. Distortion-free dynamic range in excess of 115 dB is achievable for detected optical power of 20 mW. This range, of course, is subject to decrease from any noise in the system external to the waveguides. By eliminating third order IMD terms and suppressing second order IMD terms, the system is capable of a substantially greater distortion-free dynamic range than has been achievable in the past.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A system for modulating a first optical beam with an electrical signal having a bias voltage and two modulating frequencies, comprising:
    a first waveguide having an input end,
    means for inputting said first optical beam into the input end of said first waveguide,
    means for modulating said first optical beam with said electrical signal, the modulated beam being subject to third order intermodulation distortion (IMD),
    a second waveguide having an input end,
    a first optical coupler coupling said first and second waveguides to induce in said second waveguide a second optical beam without said second waveguide receiving an optical beam at its input end, and
    a second optical coupler optically downstream from said first optical coupler coupling said second and first waveguides to induce back into said first waveguide a component of said second optical beam,
    said first and second waveguides extending directly between said first and second optical couplers so that any phase differential between the optical couplers so that any phase differential between the optical signals in said waveguides at the output of said first optical coupler is substantially preserved at the input to said second optical coupler,
    each of said optical couplers being characterized by respective coupling coefficients and lengths, and said waveguides being characterized by respective optical propagation coefficients within said optical couplers, wherein the coupling coefficients, lengths and waveguide propagation differentials for said first and second optical couplers, and the bias voltage of said electrical modulating signal, are selected to substantially reduce third order IMD in said optical beams.

2. The system of claim 1, said modulating means comprising an electro-optic coupler associated with said first optical coupler for modulating said first optical beam within said first optical coupler in response to said electrical signal.

3. The system of claim 2, said modulating means comprising a first electrode means for applying a modulating signal and a first DC bias signal to said first waveguide, said second optical coupler including a second electrode means for applying a second DC bias signal to said first waveguide to induce a linearizing phase shift in said first optical beam.

4. The system of claim 3, said first and second electrode means having substantially equal lengths along said first waveguide, and said first and second DC bias signals being substantially equal.

5. The system of claim 2, said modulating means comprising a first electrode means for applying a modulating signal and a first DC bias signal to said first waveguide, said first DC bias signal inducing a phase shift in said first optical beam, and further comprising second electrode means between said first and second optical couplers for applying a second DC bias signal to said first waveguide to induce a linearizing phase shift in said first optical beam.

6. The system of claim 5, wherein said second DC bias signal is selected to induce a phase shift that is substantially equal in magnitude but opposite in polarity to the phase shift induced by said first DC bias signal.

7. The system of claim 1, wherein the waveguide propagation differential for said second optical coupler is substantially zero and for said first optical coupler is non-zero.

8. The system of claim 7, wherein the products of the coupling coefficients and lengths of the first and second optical couplers are respectively about $9\pi/2$ and 1.605, and the product of the length and waveguide propagation differential for the first optical coupler is about 6.79.

9. The system of claim 1, wherein the length of said first optical coupler and the differential in the optical propagation coefficients of said first and second waveguides within said first optical coupler at a predetermined desired modulation voltage are selected to restrict second order IMD in said first optical signal to a level less than the fifth order IMD.

10. The system of claim 1, for modulation at two frequencies with the higher frequency less than twice the lower frequency, further comprising a filter for removing second order IMD from one of said optical signals.

11. The system of claim 1, wherein said first and second waveguides are disposed parallel to each other within said first and second optical couplers and are separated therein by a dielectric material.

12. A method of modulating a first optical beam with an electrical signal, comprising:
    directing said first optical beam through a first waveguide,
    electro-optically modulating said first optical beam within said first waveguide with an electrical signal having a first DC bias voltage and two modulating frequencies that are subject to third order intermodulation distortion (IMD),
    coupling a portion of said modulated first optical beam into a second waveguide over a first coupling length, said second waveguide having a different optical propagation coefficient over said first coupling length than said first waveguide so that the coupled beam portion in said second waveguide is out-of-phase with the beam in said first waveguide, substantially excluding optical signals from said second waveguide other than optical signals coupled into said second waveguide from said first waveguide, cross-coupling in-phase portions of the beams in said first and second waveguides over a second coupling length to produce an output beam, preserving the out-of-phase relationship between the beams in said first and second waveguides between said first and second coupling lengths, and selecting the bias voltage of said electrical signal, the optical propagation properties of said waveguides and said first and second coupling lengths such that said cross-coupling in said second waveguide substantially negates third order IMD in said modulated optical beam over a predetermined operating range.

13. The method of claim 12, further comprising the step of applying a second bias voltage to said first optical beam within said second coupling length to induce a linearizing phase shift in said first optical beam.

14. The method of claim 13, wherein said first and second DC bias voltages are substantially equal and are applied over substantially equal lengths of said first waveguide.

15. The method of claim 12, further comprising the step of applying a second DC bias voltage to said first waveguide between said first and second coupling lengths to induce a linearizing phase shift in said first optical beam.

16. The method of claim 15, wherein said second DC bias voltage is selected to induce a phase shift that is substantially equal in magnitude but opposite in polarity to the phase shift induced by said first DC bias voltage.

17. The method of claim 12, wherein said electro-optic modulation of said first optical beam occurs over at least a portion of said first coupling length and establishes said differential in optical propagation coefficients between said first and second waveguides over said first coupling length.

18. The method of claim 17, wherein the products of said first and second coupling lengths and their respective coupling coefficients between said first and second waveguides are respectively about $9\pi/2$ and 1.605, and the product of said first coupling length and the differential in optical propagation coefficients for said waveguides over said first coupling length is about 6.79.

19. The method of claim 12, wherein said first coupling length and the differential in the optical propagation coefficients of said first and second waveguides over said first coupling length at said bias voltage are selected to restrict second order IMD in said output beam to a level less than the fifth order IMD.

20. The method of claim 12, wherein the higher of said two modulating frequencies is less than twice the lower frequency, further comprising the step of filtering second order IMD from said output beam.

* * * * *